United States Patent [19]

Gaiser

[11] Patent Number: 4,770,471
[45] Date of Patent: Sep. 13, 1988

[54] DECELERATION AND PRESSURE SENSITIVE PROPORTIONING VALVE ASSEMBLY WITH BRAKING TORQUE ADJUSTABILITY

[75] Inventor: Robert F. Gaiser, Stevensville, Mich.

[73] Assignee: Allied Corporation, Morristown, N.J.

[21] Appl. No.: 944,079

[22] Filed: Dec. 22, 1986

[51] Int. Cl.⁴ .............................................. B60T 8/06
[52] U.S. Cl. .................................... 303/24.1; 303/112
[58] Field of Search ............... 303/24 A, 24 C, 24 R, 303/24 B, 24 BB, 24 F, 112

[56] References Cited

U.S. PATENT DOCUMENTS

| | | | |
|---|---|---|---|
| 3,349,875 | 10/1967 | Stelzer | 303/112 |
| 3,689,121 | 9/1972 | Kawabe et al. | 303/112 |
| 4,205,883 | 6/1980 | Gaiser | 303/24 F |
| 4,588,205 | 5/1986 | Gaiser | 280/275 |
| 4,595,243 | 6/1986 | Gaiser | 303/24 A |
| 4,615,419 | 10/1986 | Gaiser | 303/112 |
| 4,652,058 | 3/1987 | Runkle et al. | 303/24 F |
| 4,679,864 | 7/1987 | Myers et al. | 303/24 F |

FOREIGN PATENT DOCUMENTS

| | | |
|---|---|---|
| 0195922 | 10/1986 | European Pat. Off. |
| 1805666 | 5/1979 | Fed. Rep. of Germany ...... 303/112 |
| 1035443 | 7/1966 | United Kingdom |
| 2049848 | 12/1980 | United Kingdom |

Primary Examiner—Duane A. Reger
Assistant Examiner—Matthew C. Graham
Attorney, Agent, or Firm—Larry J. Palguta; Ken C. Decker

[57] ABSTRACT

A proportioning valve assembly (10) in a housing (12) is pressure responsive to control the flow of fluid to a wheel brake. A proportioning valve (20) is disposed within a chamber (26) having an inlet (33) and outlet (114), the inlet (33) receiving pressure from a pressure generator such as a master cylinder. A poppet (80) of the proportioning valve (20) is connected by a shaft (90) with a plunger (100) disposed within another chamber (30), the other chamber (30) being isolated from fluid pressure in the chamber (26) housing the proportioning valve. A fluid-containing chamber (13) contains an inertia sensing mass (40) which engages a valve mechanism (34) that controls fluid communication between the fluid-containing chamber (13) and other chamber (30). A friction element (120) of the wheel brake engages a braking torque responsive valve (140) which communicates fluid pressure to a chamber (30a). The position of the poppet (80) is adjusted by the braking torque responsive valve (140) in order to eliminate the variable effects of friction elements having a variation in lining thickness and coefficient of friction.

24 Claims, 2 Drawing Sheets

DECELERATION AND PRESSURE SENSITIVE PROPORTIONING VALVE ASSEMBLY WITH BRAKING TORQUE ADJUSTABILITY

This invention relates to a deceleration and pressure sensitive proportioning valve assembly with braking torque adjustability, the adjustment for braking torque eliminating the effects of variable friction element thickness and variable coefficients of friction.

U.S. Pat. Nos. 4,595,243; 4,652,058 and 4,679,864 disclose proportioning valve assemblies which may be disposed entirely within or without the body of the master cylinder, and provide for deceleration and pressure sensitive response in order to reduce fluid pressure communicated to the rear wheels. By reducing brake fluid pressure applied to the rear wheels in loaded and unloaded vehicle situations, appropriate braking pressures are communicated to the rear wheels in accordance with vehicle loading so that braking distance will be shortened and wheel lock-up and subsequent skidding is minimized. Co-pending patent application Ser. Nos. 799,219 and 924,966 illustrate embodiments which eliminate the need for a fluid-containing chamber or reservoir and provide completely self-contained proportioning valve assemblies. It is the object of the above-described proportioning valve assembly to control the communication of pressurized fluid to the rear wheel brakes relative to vehicle loading, i.e., the greater the vehicle weight, the greater the desired fluid pressure to be communicated to the brake assemblies and the greater the wheel braking torque. This was accomplished by using conventional type proportioning valves modified to control the break-point or knee when the vehicle load was varied. This modification included moving the poppet position of the proportioning valve assembly (normally a fixed position) away from the proportioning valve piston. The result was that the greater the amount of poppet travel, the greater the amount of piston travel, and hence this permitted the increased communication of fluid pressure to the wheel brakes and resulted in a higher break-point. In these embodiments, poppet travel was controlled by the inlet pressure of the proportioning valve assembly, the inlet pressure being generated by the master cylinder. Thus, the greater the inlet pressure, the greater the amount of poppet travel, to a predetermined point. If the amount of poppet travel was too great, rear wheel skidding could possibly occur and thus the tolerance on the break-point was too wide or too great. This predetermined point was established by using a valve controlled by inertia or the deceleration force. When the deceleration of the vehicle reached a predetermined value, the decleration responsive valve closed and stopped further travel of the poppet. At this point, the moving differential area piston of the proportioning valve assembly would approach the poppet and regulate or meter the outlet pressure of the proportioning valve assembly. This proportioning valve assembly functioned satisfactorily within the tolerances of those parameters which affected the break-point tolerance. However, it is desired to provide an improved means for positioning the poppet because of the wide variance in the coefficient of friction of the brake pads. It has been found that the lining thickness of brake pads can vary greatly, in addition to the wide variation in the coefficient of friction between "green" linings and "aggressive" linings. Aggressive linings are those brake pads or linings which have high coefficients of friction, whereas green linings tend to have lower coefficients of friction. The present invention provides a deceleration and pressure sensitive proportioning valve assembly which includes braking torque adjustability so that the assembly operates appropriately in a predetermined manner, without the operational characteristics of the assembly being affected by a wide variation of friction lining thickness and coefficient of friction.

The present invention provides a proportioning valve assembly for a vehicle, the valve assembly having an inlet communicating with a fluid pressure source and an outlet communicating with a brake assembly, a pressure responsive assembly cooperating with the inlet and the outlet to vary fluid communication therebetween, a fluid-containing chamber having therein an inertia sensing mass responsive to deceleration of the vehicle and cooperating with the pressure responsive assembly to assist in the variation of fluid communicated between the inlet and the outlet, the fluid-containing chamber communicating with a first chamber by means of valve means disposed therebetween, the valve means engaged by said inertia sensing mass, the pressure responsive assembly disposed within a second chamber and including a part connected with a pressure responsive member disposed within said first chamber, and braking torque responsive means communicating fluid pressure to said first chamber, the first chamber separated from fluid pressure within the second chamber so that the pressure responsive member is positioned responsive to braking torque and without being subjected to fluid pressure at the inlet.

The accompanying drawings show, for the purpose of exemplification and without limiting the invention of the claims thereto, an embodiment illustrating the principles of the invention wherein:

Figure 1:
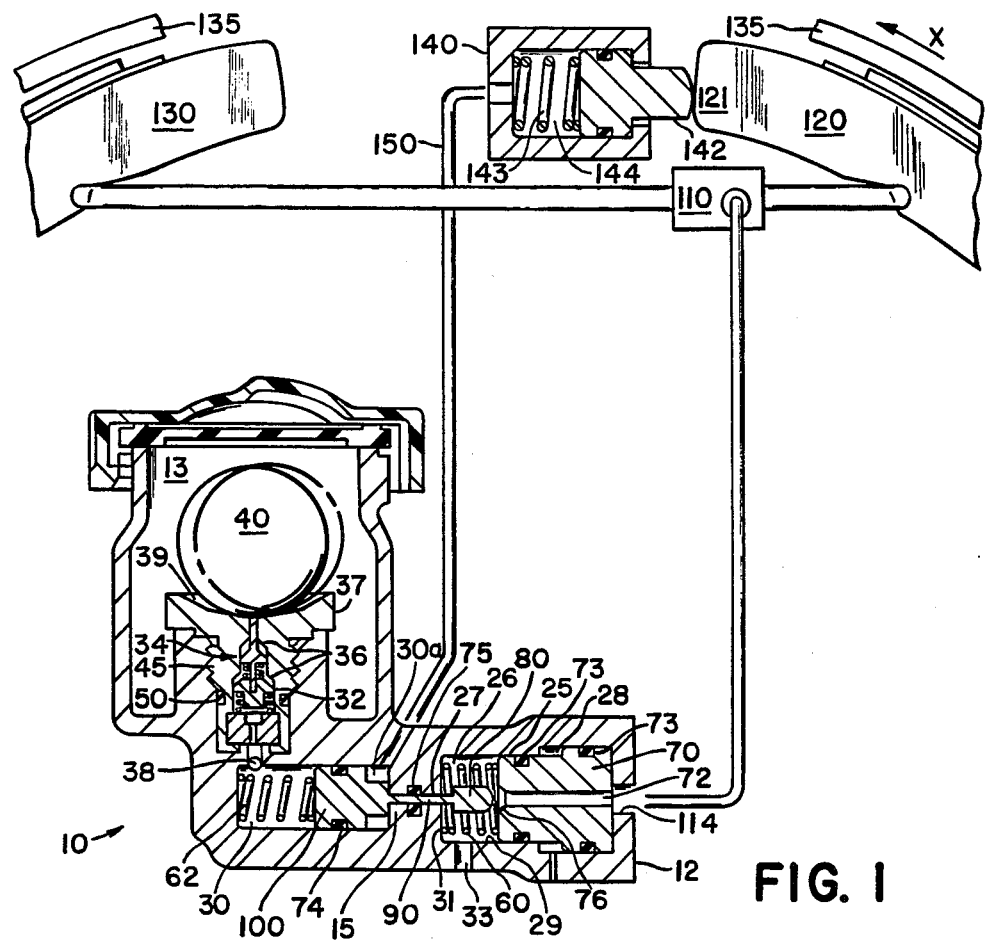
FIG. 1 is a section view of the proportioning valve assembly and braking torque responsive valve of the present invention.
Figure 2:
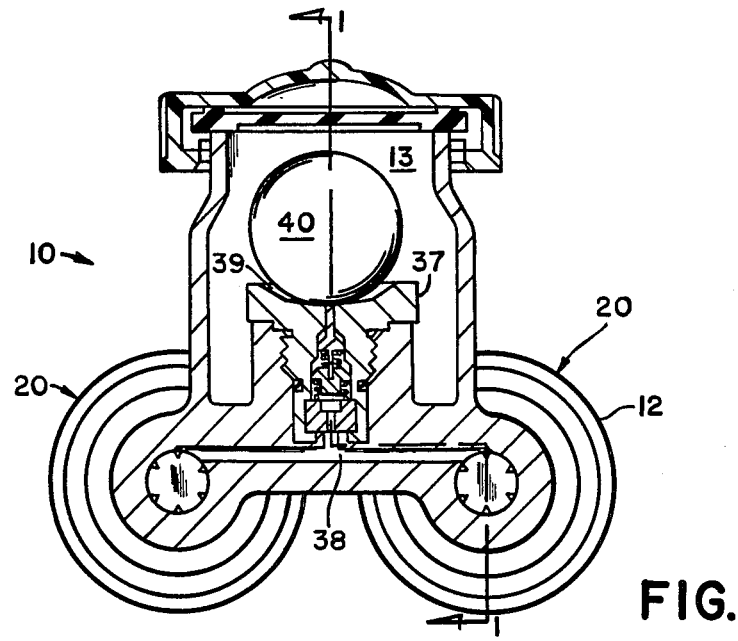
FIG. 2 is an end section view of the proportioning valve assembly.

FIGS. 1 and 2 illustrate an embodiment of the proportioning valve assembly of the present invention which is designated generally by reference numeral 10. Proportioning valve assembly 10 may be contained within a housing 12 that is separate from the body of the master cylinder (not shown) and which has its own fluid-containing chamber or reservoir 13. U.S. Pat. No. 4,679,864 discloses a deceleration and pressure sensitive proportioning valve assembly with low deceleration responsiveness and the Application is incorporated by reference herein. As described previously above, an object of the present invention is to provide an improved means for positioning the poppet so that the performance of the proportioning valve assembly is not affected adversely by the wide variance in coefficients of friction due to brake lining thickness and green linings versus aggressive linings. The effects of the variation in the coefficient of friction of braking linings and how that affects the break-point of the proportioning valve assembly may be understood by examining the following characteristics. A desired break-point is determined by the torque developed at the wheels and by deceleration. The torque developed at the wheels is determined essentially by the following: (1) wheel cylinder diameter (constant), (2) drum diameter (constant), (3) lining coefficient of friction (variable), and (4) inlet pressure (controlled by the vehicle driver). Thus, the one variable which should be controlled is the lining coefficient of friction. By controlling the poppet position as a function of torque, it is possible to eliminate the variable of the lining coefficient of friction and provide an improved or reduced break-point tolerance. A distinct added advantage of utilizing braking torque to set an appropriate poppet position is that a rapid application of pressure at the inlet (such as a "spike" application of the brakes) has a minimal effect on "overshoot" of the poppet position.

The proportioning valves 20 (see FIG. 2) contained within the housing 12 are for a split braking circuit having a fluid pressure outlet 114 communicating with a rear wheel cylinder and another fluid pressure outlet (not shown) communicating with the other rear wheel cylinder. The design is not restricted to cross-split bearing systems. A single or dual proportioning valve design can be used for an axle-axle bearing system. FIG. 1 illustrates a stepped bore 25 which communicates with the master cylinder (not show) by means of passageway 33. Bore 25 comprises a chamber 26 which is connected by means of a narrow passage 27 with a chamber 30 that communicates with the reservoir or fluid-containing chamber 13. Stepped opening 32 houses a valve 34 which may engage valve seats 36, and valve 34 engages the inertia sensing mass or ball 40. Ball 40 is located within the fluid-containing chamber or reservoir 13 and is disposed upon a ramp or variable sloped surface 39. The sloped surface may have variable slopes depending upon the particular application, and is disclosed in U.S. Pat. No. 4,679,864 incorporated by reference herein. Valve 34 may comprise any one of numerous valve constructions which would function appropriately in the present invention, and is illustrated herein as the valve 34. Inertia sensing ball 40 is located entirely separate from the path of fluid flow through chamber 26 and is free to move along variably slope ramp or surface 39. Inertia sensing ball 40 holds second valve 34 open until a certain predetermined attitude is attained by the vehicle during deceleration or when deceleration displaces ball 40 along ramp 39. Bore 25 includes an enlarged diameter section 28 having therein a differential piston 70. Differential are a piston 70 includes a through opening 72 providing for communication of outlet 114 with bore 25. Seals 73 are disposed about differential piston 70 which has a valve seat 76 located within reduced diameter section 29 of stepped bore 25. A first spring 60 biases the differential piston 70 to the right in FIG. 1, with one end of spring 60 abutting a housing shoulder 31. A poppet 80 is positioned within chamber 26 by means of a shaft 90 connected with a plunger or differential area piston 100 located within chamber 30. Plunger 100 is biased by spring 62 to the right in FIG. 1, and a seal 74 extends around plunger 100. A seal 75 located within housing wall 15 is disposed about shaft 90 so that chambers 26 and 30 are isolated from the respective fluid pressures therein. Thus, poppet 80 is connected to a shaft 90 which is of such a small diameter that the effect of seal resistance and the minimal shaft diameter effectively eliminate the application of any inlet pressure upon plunger 100. As a result, poppet 80 is not affected, positioned, or displaced by fluid pressure at inlet 33.

The inertia sensing ball 40 is disposed in a location that is separate from the fluid flow path leading from the master cylinder to the associated rear brakes. Thus, inertia sensing ball 40 is not subject to fluid flow characteristics that occur within the fluid flow path during braking. Ball 40 is disposed on the variable sloped surface 39 of valve body 37. The proportioning valves 20 illustrated in FIG. 2 are connected together by channel 38. Valve body 37 includes threads 45 which are threadedly engaged with complementary threads of housing 12. O-ring seal 50 is disposed about body 37 in order to provide a seal between housing 12 and body 37. The variable sloped surface 39 is annular and permits multidirectional movement of ball 40 so that the ball is responsive vectorially to both longitudinal deceleration and lateral deceleration of the vehicle.

As illustrated schematically in FIG. 1, the outlet 114 is connected with the wheel cylinder or piston 110 which actuates the friction elements 120 and 130. The friction elements engage the rotating drum 135 to effect braking thereof. It should be clearly understood that the wheel cylinder or piston 110 is illustrated schematically because the present invention can be used with either a drum brake or a disc brake, and the friction elements 120 and 130 can likewise comprise friction pads utilized within a disc brake to brake a rotor (not shown). The friction element 120 engages a braking torque responsive valve 140 which comprises a valve member 142 abutting shoe end 121, a spring 143 biasing valve member 142 into engagement with shoe end 121, and a fluid-containing chamber 144. Valve 140 is connected by fluid line 150 with the chamber 30, and more specifically chamber 30a. Thus, when friction element 120 engages the rotating drum or rotor of the brake and braking occurs, the displacement of the friction element (in the direction of arrow X) caused by the braking torque effects displacement of valve member 142 into valve 140 to pressurize fluid therein and communicate the pressurized fluid to chamber 30a.

Figure 4:
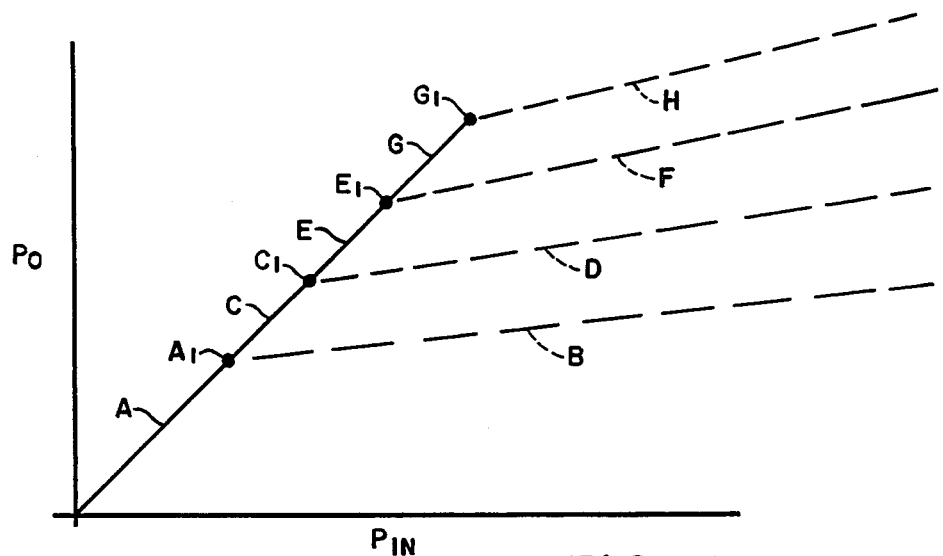
FIG. 4 is a graph of $P_{out}$ versus $P_{in}$ for the proportioning valve assembly of the present invention.

Each proportioning valve 20 contained within housing 12 operate as follows: pressurized brake fluid received through inlet 33 passes into chamber 26, through valve seat 76, opening 72, and to outlet 114 and the wheel cylinder of a rear wheel brake. When the inlet pressure rises to a level sufficient to displace differential piston 70 to the left in FIG. 1, valve seat 76 moves toward poppet 80 to cause restriction of brake fluid and pressure communicated through opening 72 to the rear wheel brake. When braking commences, the friction elements engage the member to be braked (brake drum or rotor) and this engagement causes the friction element to be displaced against valve member 142. The fluid pressure generated within valve 140 is communicated through connection 150 to chamber 30a so that whatever the brake lining thickness and coefficient of friction (green or aggressive), the fluid pressure communicated through line 150 causes piston 100 to be displaced and poppet 80 is positioned accordingly. Thus, the poppet is positioned initially during braking so that the proportioning valve assembly can operate appropriately according to the various structural and functional characteristics of the braking system at the time of braking. As piston 70 moves to the left, it approaches the poppet 80 and a first break-point may be established. Referring to FIG. 4, there is illustrated the relationship of output pressure to input pressure wherein during initial braking the curve A is generated. When the differential piston 70 approaches poppet 80, the first break-point $A_1$ may be established and the brake pressure would proceed in accordance with curve B illustrated in FIG. 4. Curve B is an illustrative pressure curve for a vehicle having aggressive braking linings, unloaded, and thus having the highest amount of deceleration. In operation, an aggressive friction lining will result in greater displacement of the friction element 120, increased displacement of valve member 142 and the communication of a higher fluid pressure through line 150 to chamber 30a. Thus, it would appear initially that the displacement of the plunger 100/poppet 80 construction would be greater than in a case where the friction element includes a green lining. However, when the vehicle has aggressive braking linings and thus a higher deceleration, the higher deceleration results in the inertia sensing ball 40 being displaced quicker and the valve 34 closing sooner, and once valve 34 closes then the communication of fluid from chamber 30 to fluid-containing chamber 13 ceases and the movement of plunger 100 is arrested. Thus, the movement of the plunger/poppet for an aggressive braking lining is less than the movement of the plunger/poppet for a green lining because the inertia sensing ball is displaced quicker by the higher deceleration which results in a faster termination of the movement of plunger 100. If the friction element lining is green so that there is a lower deceleration effected because of the lower coefficient of friction between the lining and drum/rotor of the brake, then there is less displacement of the friction element 120 against valve member 142 and the communication of a lower fluid pressure through line 150 to chamber 30a. Thus, even though there is a lower fluid pressure communicated to chamber 30a for a green lining than for an aggressive lining, because there is less deceleration of the vehicle the valve 34 does not close as quickly and plunger 100/poppet 80 is displaced more to the left in FIG. 1 than for the previously described situation where the deceleration causes a quicker closing of valve 34 and arresting of the movement of plunger 100. The plunger and poppet 80 move further to the left and the gap between poppet 80 and seat 76 of differential piston 70 remains open for a longer period of time and permits the communication of a greater amount of pressurized brake fluid to the brake cylinder 110. The pressure output curve follows curve C and eventually break-point $C_1$ is reached for the situation comprising a green friction lining, with an unloaded vehicle, and a somewhat high rate of deceleration. The brake pressure will proceed in accordance with curve D. As would follow from the above description of the operation of proportioning valve assemblies 20, the situation of an aggressive brake lining for a loaded vehicle which results in a lower rate of deceleration than for the previously described situation, produces the pressure curve E and break-point $E_1$, and then progressing along curve F. Finally, the situation of a green friction lining for a loaded vehicle results in the lowest rate of deceleration and correspondingly the greatest amount of plunger/ poppet travel. This results in the pressure output characteristics of the pressure curve G and break-point $G_1$ whereupon the curve would proceed in accordance with curve H illustrated in FIG. 4.

The proportioning valve assembly of the present invention can provide for a significant improvement in the ability to prevent or minimize wheel lock-up regardless of the initial and later condition of the brake linings. The wide variation in brake lining thickness and coefficient of friction associated with new "green" brake linings and "aggressive" brake linings, is a significant variable factor in determining and controlling braking torque developed at the wheels. The elimination of this variable, or compensation therefore, by using the braking torque to position the poppet during the braking cycle, and having the poppet position unaffected by the inlet pressure received from the master cylinder, results in a proportioning valve assembly which operates appropriately for the variable characteristics. In effect, the variable characteristics have been compensated for or rendered constant according to the respective structural and functional situations so that the proportioning valve assembly of the present invention operates within the predetermined tolerances desired for an effective proportioning valve assembly.

Figure 3:
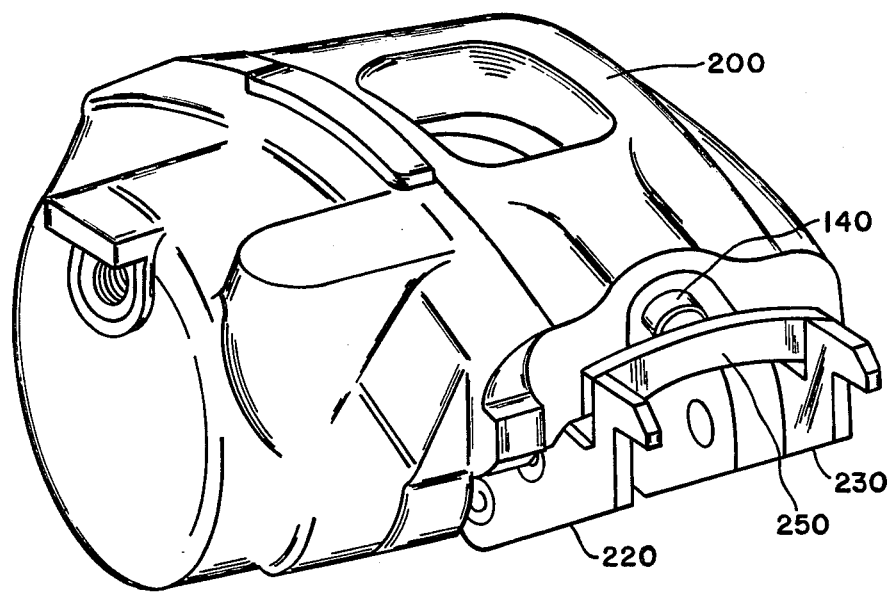
FIG. 3 is a perspective view of a disc brake equipped with a braking torque responsive valve utilized in the present invention.

FIG. 3 illustrates a perspective view a typical disc brake comprising the caliper 200 and friction elements 220 and 230. The bar 250 extending across brake pad backing plates 220 and 230 engages the braking torque responsive valve 140 that is housed within the caliper 200. The valve 140 is connected by line 150 (not shown) with chambers 30 of the proportioning valve assemblies 20. Thus, the proportioning valve assembly of the present invention may be utilized with a drum brake, servo and non-servo, and a disc brake.

Although this invention has been described in connection with the illustrated embodiment, it will be obvious to those skilled in the art that various changes may be made in form, structure, and arrangement of parts without departing from the scope of the invention.

I claim:

1. In a proportioning valve assembly for a vehicle, the valve assembly having an inlet communicating with a fluid pressure source and an outlet communicating with a brake assembly, a pressure responsive assembly cooperating with the inlet and the outlet to vary fluid communication therebetween, a fluid-containing chamber having therein an inertia sensing mass responsive to deceleration of the vehicle and cooperating with the pressure responsive assembly to assist in the variation of fluid communicated between the inlet and the outlet, the fluid-containing chamber communicating with a first chamber by means of valve means disposed therebetween, the valve means engaged by said inertia sensing mass, the pressure responsive assembly disposed within a second chamber and including a part connected with a pressure responsive member which defines a portion of said first chamber and a portion of a third chamber, and braking torque responsive means communicating braking torque forces to said pressure responsive member defining a portion of said third chamber, the third chamber separated from fluid pressure within the second chamber so that the pressure responsive member is positioned responsive to braking torque and without being subjected to fluid pressure at the inlet, and the inertia sensing mass and braking torque responsive means able to effect operation of the pressure responsive member independently of one another.

2. The proportioning valve assembly in accordance with claim 1, wherein the part of the pressure responsive assembly comprises a poppet.

3. The proportioning valve assembly in accordance with claim 2, wherein the pressure responsive assembly includes a differential area piston having therein a through opening.

4. The proportioning valve assembly in accordance with claim 3, wherein the pressure responsive assembly includes resilient means biasing said differential area piston away from said poppet.

5. The proportioning valve assembly in accordance with claim 1, wherein the pressure responsive member comprises a differential area piston biased by spring means.

6. The proportioning valve assembly in accordance with claim 5, wherein said fluid-containing chamber conprises a reservoir and the inertia sensing mass comprises a ball.

7. The proportioning valve assembly in accordance with claim 6, wherein the braking torque responsive means comprises a valve engaged by a friction element of a brake, movement of said friction element responsive to braking torque causing operation of said valve and communication of fluid pressure to said third chamber.

8. The proportioning valve assembly in accordance with claim 7, wherein the valve means is biased by a spring into engagement with the ball.

9. The proportioning valve assembly in accordance with claim 8, wherein said ball is disposed on a sloped surface so that deceleration of the vehicle causes displacement of the ball.

10. The proportioning valve assembly in accordance with claim 1, wherein said pressure responsive member and part are connected by a shaft extending through an opening between the second and third chambers and sealing means disposed about said shaft.

11. The proportioning valve assembly in accordance with claim 10, wherein the proportioning valve assembly includes a body which houses said reservoir, first chamber, and second chamber.

12. The proportioning valve assembly in accordance with claim 11, wherein the outlet communicates with piston means which effects operation of said brake assembly.

13. The proportioning valve assembly in accordance with claim 1, wherein the part comprises a poppet and the pressure responsive member comprises a stepped piston biased by spring means, the poppet and stepped piston connected by a shaft extending between the second and third chambers.

14. In a proportioning valve assembly for a vehicle, the valve assembly having an inlet communicating with a fluid pressure source and an outlet communicating with a brake assembly, a pressure responsive assembly cooperating with the inlet and the outlet to vary fluid communication therebetween, a fluid-containing chamber having therein an inertia sensing mass responsive to deceleration of the vehicle and cooperating with the pressure responsive assembly to assist in the variation of fluid communicated between the inlet and the outlet, the fluid containing chamber communicating with a first chamber by means of valve means disposed therebetween, the valve means engaged by said inertia sensing mass, characterized in that the pressure responsive assembly is disposed within a second chamber and includes a part connected with a pressure responsive member which defines a portion of said first chamber and a portion of a third chamber, and braking torque responsive means communicating braking torque forces to said pressure responsive member defining a portion of said third chamber, the third chamber separated from fluid pressure within the second chamber so that the pressure responsive member is positioned responsive to braking torque and without being subjected to fluid pressure at the inlet, and the mass and torque responsive means able to effect operation of the pressure responsive member independently of one another.

15. The proportioning valve assembly in accordance with claim 14, wherein the part of the pressure responsive assembly comprises a poppet.

16. The proportioning valve assembly in accordance with claim 14, wherein the pressure responsive member comprises a plunger biased by spring means.

17. The proportioning valve assembly in accordance with claim 16, wherein said fluid-containing chamber comprises a reservoir and the inertia sensing mass comprises a ball.

18. The proportioning valve assembly in accordance with claim 17, wherein the braking torque responsive means comprises a valve engaged by a friction element of a brake, movement of said friction element responsive to braking torque causing operation of said valve and communication of fluid pressure to said third chamber.

19. The proportioning valve assembly in accordance with claim 18, wherein the valve means is biased by a spring into engagement with the ball.

20. The proportioning valve assembly in accordance with claim 19, wherein said ball is disposed on a sloped surface so that deceleration of the vehicle causes displacement of the ball.

21. The proportioning valve assembly in accordance with claim 14, wherein said pressure responsive member and part are connected by a shaft extending through an opening between the second and third chambers and sealing means disposed about said shaft.

22. The proportioning valve assembly in accordance with claim 21, wherein the proportioning valve assembly includes a body which houses said reservoir, first chamber, and second chamber.

23. The proportioning valve assembly in accordance with claim 14, wherein the part comprises a poppet and the pressure responsive assembly comprises a stepped piston biased by spring means, the poppet and plunger connected by a shaft extending between the second and third chambers.

24. The proportioning valve assembly in accordance with claim 14, wherein the braking torque responsive means communicates the fluid pressure to the third chamber so that the pressure responsive member is displaced away from the second chamber.

* * * * *